N. M. Phillips.
Lathe Work-Holder.
Nº 20,298.    Patented May 18, 1858.

UNITED STATES PATENT OFFICE.

NATHAN M. PHILLIPS, OF NEW YORK, N. Y.

LATHE-DOG.

Specification of Letters Patent No. 20,298, dated May 18, 1858.

*To all whom it may concern:*

Be it known that I, NATHAN M. PHILLIPS, of the city, county, and State of New York, have invented certain new and useful Improvements in Lathe-Dogs to be Adjusted to Fit and be Attached to Various-Sized Articles; and I do hereby declare that the following is a full and exact description of the same, reference being had to the accompanying drawings, and to the letters of reference marked thereon, in which—

Figure 1:
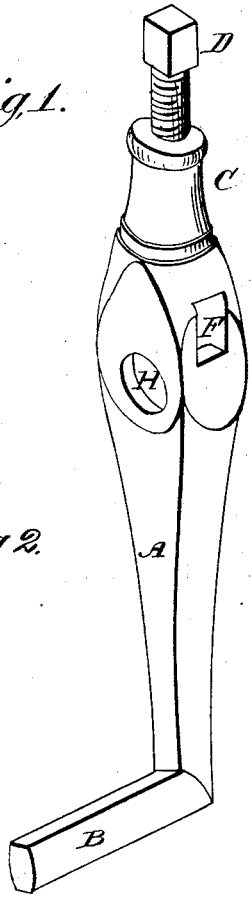
Figure 2:
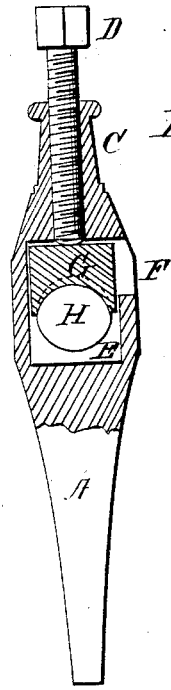
Figure 3:
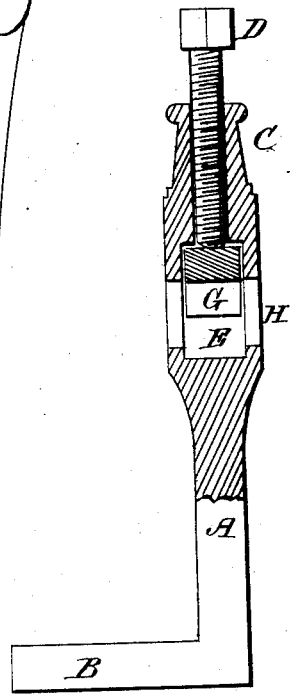

Figure 1 is a perspective view of the dog, Fig. 2 a vertical section through the center of the dog in line with its face, and Fig. 3 a vertical section through the center at a right angle with its face.

A is the body of the dog, having the tail B at its lower end—standing at a right angle to it—which is placed in a slotted aperture in the lathe chuck, or against a pin secured in that aperture, to revolve the article to which the dog is attached, and the head C, at its upper end, in which is placed and operated the set screw D by which the follower G is forced down to secure the dog to the article upon which it is placed. The body of the dog is formed or cast in one piece for the purpose of giving it greater strength than it would possess if made in separate pieces or sections.

E is a slotted aperture in the body, having an opening F through which is inserted to the aperture the follower G. When the follower is fitted to, and placed in its position, this opening may be covered up by a plate to prevent its falling out, when the dog is not in use, if it should be deemed necessary or desirable.

H is a circular hole cast or drilled through the front and back faces of the body and through the bottom end of the follower G, so that when the follower is elevated to the top of the aperture E the top of the hole in it is coincident with the top part of the hole in the body, and when it is depressed to the bottom of the aperture the top of the hole in it is nearly or quite in line with the bottom of the hole in the body.

The dog—except the set screw—may be made of what is commercially known as "malleable iron," as that material will possess sufficient strength for the purpose while it will require less finishing, and the dog can be manufactured from it at much less expense than if it were forged from wrought iron.

To be used, the dog is placed on, and over the end of the article to be turned—the follower being moved to, or toward the upper end of the aperture E—and the set screw is turned down upon the follower until the article is firmly secured between the lower part of the circular hole in the body and the upper part of the hole in the follower. It is released from the article by turning back the set screw and allowing the follower to move toward the top of the aperture named.

The lathe dog in ordinary use is only adapted to be used upon articles having a diameter nearly as large as the hole in it, and consequently a larger number of them are required to fit the large variety of sized articles upon which they are to be used in the ordinary course of business in an iron working shop. While the dog herein described can be used upon, and for any sized article from the smallest up to one having a diameter equal to the diameter of the hole in the dog. The hold of the former is made by forcing the point of its set screw upon and into the article to which it is attached, making a scar or mark where the point of the screw touches or bears that is injurious and unsightly, and is less secure than the hold of the latter because a smaller bearing is obtained by it upon the article.

I do not claim broadly making the hole in a lathe dog, in which the article to be turned is placed, adjustable to fit, receive, and hold different sized articles but What I do claim as my invention and desire to secure by Letters Patent is—

The lathe dog herein described, having its body formed of one piece and having an aperture E in which the follower G operates in the manner, and for the purposes set forth.

NATHAN M. PHILLIPS.

Witnesses:
FRANCIS S. LOW,
M. HASKELL.